United States Patent [19]

Fukuda et al.

[11] 4,276,639
[45] Jun. 30, 1981

[54] TELEPHONE EXCHANGE WITH TIME SHARED SPEECH PATHS AND SELECTIVELY ATTENUATED SPEECH SIGNALS

[75] Inventors: Takeo Fukuda, Yokohama; Tadashi Murayama, Kawasaki; Kiyoshi Urui, Yokohama, all of Japan

[73] Assignee: Tokyo Shibaura Denki Kabushiki Kaisha, Kawasaki, Japan

[21] Appl. No.: 25,585

[22] Filed: Mar. 30, 1979

[30] Foreign Application Priority Data

Apr. 14, 1978 [JP] Japan .................................. 53/43999

[51] Int. Cl.³ ............................................ H04M 3/56
[52] U.S. Cl. ..................................................... 370/62
[58] Field of Search ........................ 179/18 BC, 1 CN; 370/62

[56] References Cited

U.S. PATENT DOCUMENTS 3,761,624   9/1973   Lewis et al. ................. 179/18 BC X
3,882,276   5/1975   Feiner et al. ..................... 179/1 CN
4,024,349   5/1977   O'Neill ......................... 179/18 BC X

OTHER PUBLICATIONS

"GTD-120 Digital PABX", by G. F. Fetterer, GTE Automatic Electric Journal, Oct. 1975, pp. 350-359.

Primary Examiner—Thomas W. Brown
Attorney, Agent, or Firm—Oblon, Fisher, Spivak, McClelland & Maier

[57] ABSTRACT

A telephone exchange comprises a plurality of central office trunk circuits, a plurality of line circuits, a plurality of switching circuits coupled to transmission paths of the trunk and line circuits, a plurality of switching circuits coupled to the reception paths of the trunk and line circuits, a variable attenuator having one end coupled commonly to the switching circuits that are coupled to the transmission path, a conference circuit coupled to the variable attenuator and the switching circuits that are coupled to the reception paths, a control circuit which controls both groups of switching circuits and the variable attenuator in time-sharing fashion thereby to provide speech paths in time-sharing fashion between selected ones of the central office trunk circuits and line circuits and which controls in time-sharing fashion the attenuation factor of the variable attenuator for each speech path established. The telephone exchange further comprises another variable attenuator which is coupled between the conference circuit and the switching circuits coupled to the reception paths and whose attenuation factor is controlled by the control circuit in time-sharing fashion.

5 Claims, 10 Drawing Figures

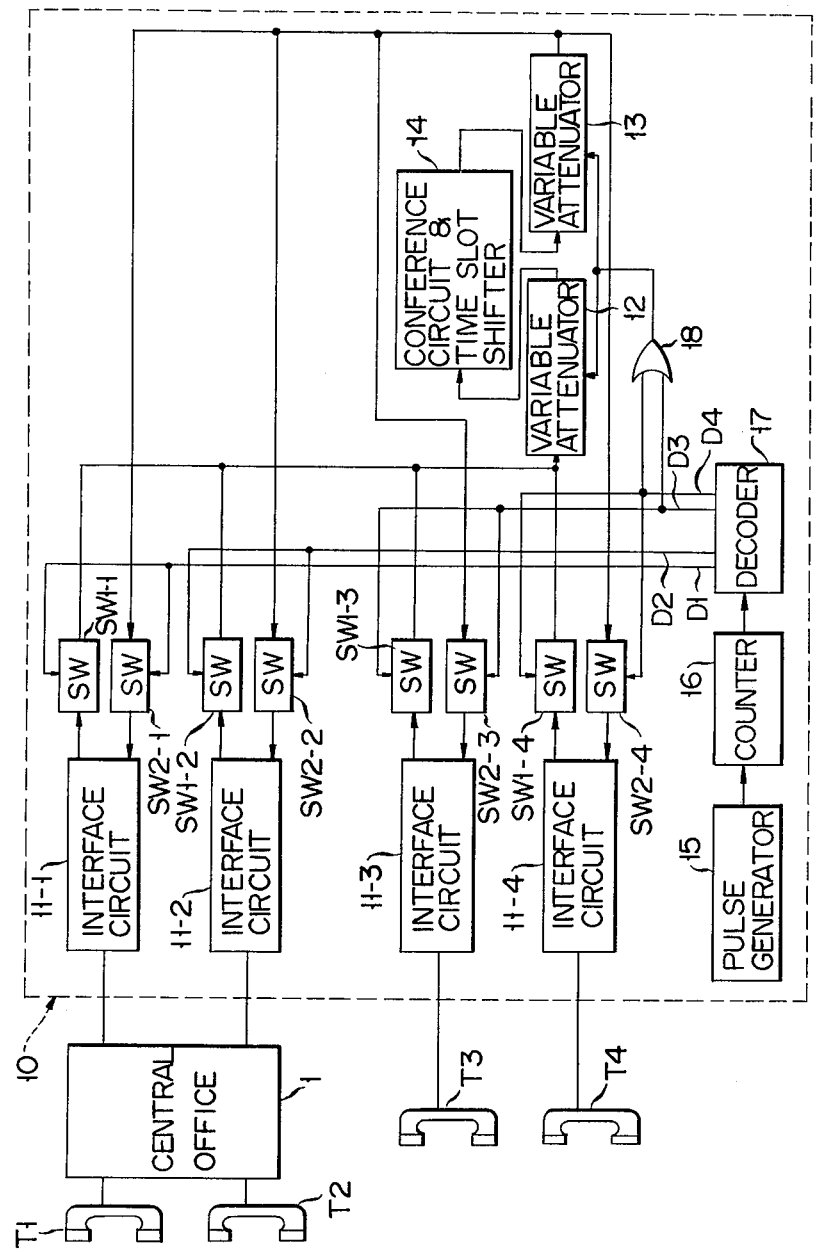
F I G. 1

FIG. 2
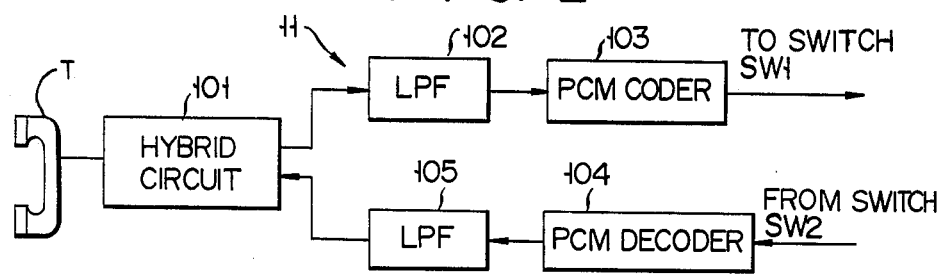
FIG. 3
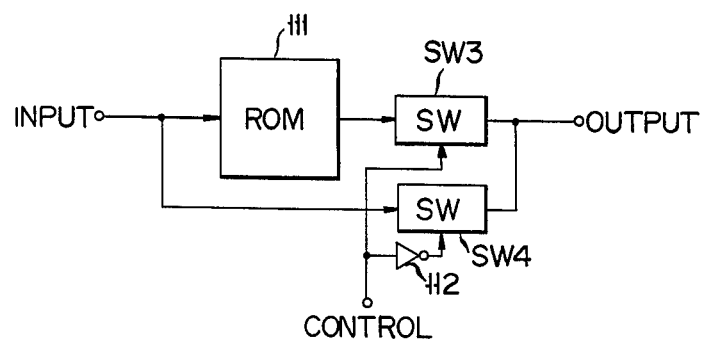
FIG. 4A
FIG. 4B
FIG. 4C
FIG. 4D
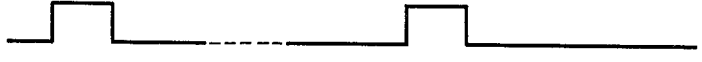
FIG. 4E

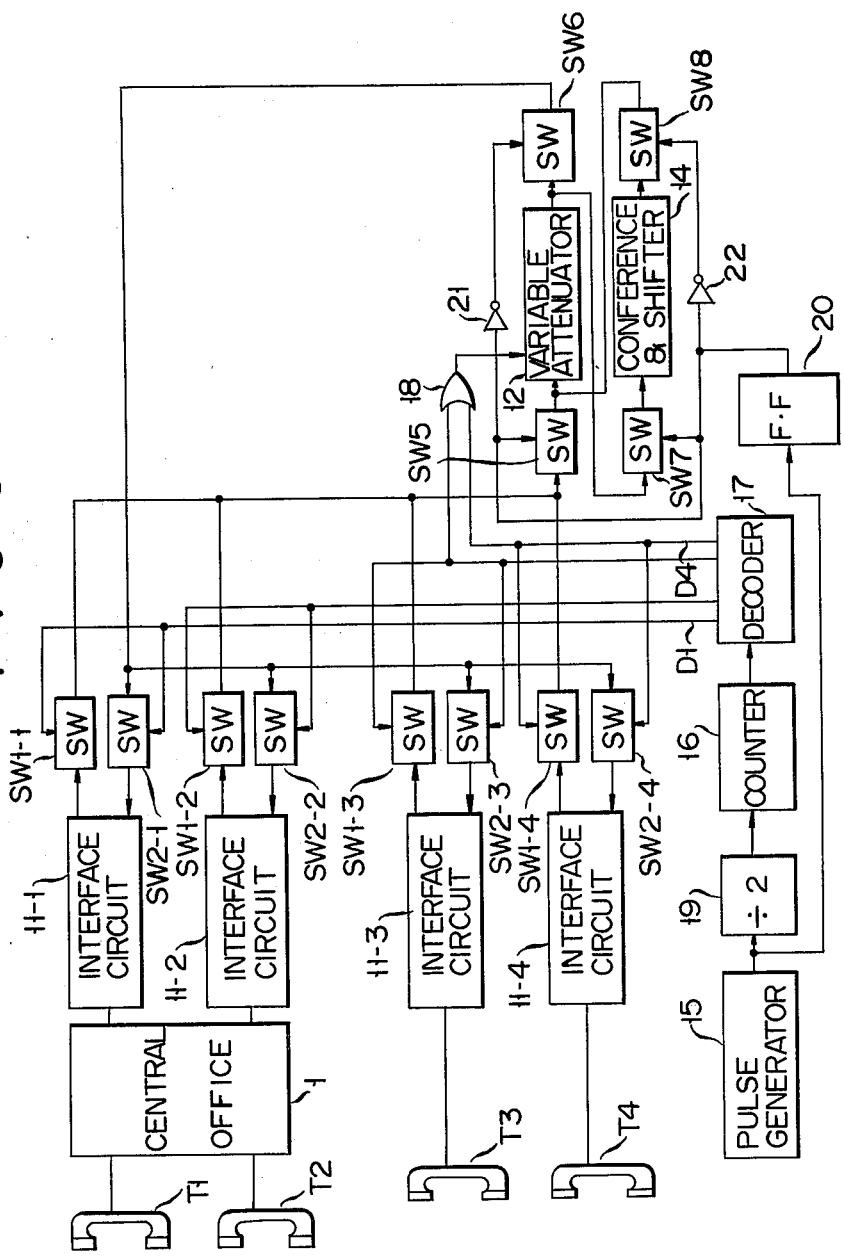
F I G. 5

TELEPHONE EXCHANGE WITH TIME SHARED SPEECH PATHS AND SELECTIVELY ATTENUATED SPEECH SIGNALS

This invention relates to a telephone exchange which selectively attenuates to a predetermined degree transmission and reception signals transferred via speech paths established between a plurality of telephones in time sharing fashion.

Recently, various private branch exchanges have been developed. With such a known private branch exchange, however, more transmission loss generally takes place between an extension telephone coupled to the exchange and an external telephone coupled to the exchange via a central office than between two extension telephones both coupled to the exchange. Usually a variable attenuator is coupled to common lines connecting the extension and external telephones. The attenuation factor of the attenuator is controlled in time-sharing fashion to attenuate speech signals transferred between any extension telephone to the same degree as the speech signals transferred between one extension telephone and one external telephone are attenuated due to the transmission loss. As a result, the audio level of every speech signal does not much differ, no matter whether it is transferred via a speech path established between two extension telephones or between one extension telephone and one external telephone.

Most recently, a telephone exchange has been developed which provides speech paths among three or more telephones in time-sharing fashion, thus realizing a telephone conversation among three or more people. This telephone exchange is provided with a conference circuit with one end coupled to the transmission paths of telephones and with the other end coupled to the reception paths of the telephones. Also in this telephone exchange, a speech signal transferred via a speech path between one extension telephone and one external telephone is more attenuated than a speech signal transferred via a speech path between two extension telephones. In this case, it is impossible to attenuate all speech signals to the same degree which are transferred through speech paths established among extension and external telephones even if a single variable attenuator which is controlled in time-sharing fashion is provided between, for example, the conference circuit and the transmission paths of the telephones. Consequently, it is impossible with such a known telephone exchange to hold a telephone conference with speech signals at substantially a constant level.

It is an object of this invention to provide a telephone exchange which establishes speech paths among a plurality of telephones in time sharing fashion and which selectively attenuates speech signals transferred through the speech paths to a predetermined degree, thereby to achieve a telephone conference with speech signals at substantially a constant level.

A telephone exchange according to one aspect of this invention comprises a plurality of interface circuits, first switching circuits with one end coupled to transmission paths of the interface circuits, second switching circuits with one end coupled to reception paths of the interface circuits and first and second variable attenuators coupled at one end to the first and second switching circuits respectively. A conference circuit is coupled between the other ends of the first and second variable attenuators, and a control circuit is coupled to the first and second switching circuits and the first and second variable attenuators for supplying timing signals to the first and second switching circuits and thus controlling the same in time-sharing fashion, thereby establishing speech paths among the interface circuits in time-sharing fashion and for supplying control signals synchronous with the timing signals to the first and second variable attenuators. By controlling the same in time-sharing fashion, the speech signals being transferred through the speech paths are attenuated according to the controlled attenuation factors of the first and second variable attenuators.

This invention can be more fully understood from the following detailed description when taken in conjunction with the accompanying drawings, in which:

FIG. 1 is a circuit diagram of a telephone exchange according to one embodiment of this invention;

FIG. 2 is a circuit diagram of an interface circuit used in the telephone exchange shown in FIG. 1;

FIG. 3 is a circuit diagram of a variable attenuator used in the telephone exchange shown in FIG. 1;

FIGS. 4A-4E show waveforms of signals for illustrating how the telephone exchange of FIG. 1 operates;

FIG. 5 is a circuit diagram of a telephone exchange according to another embodiment of this invention.

Figure 6:
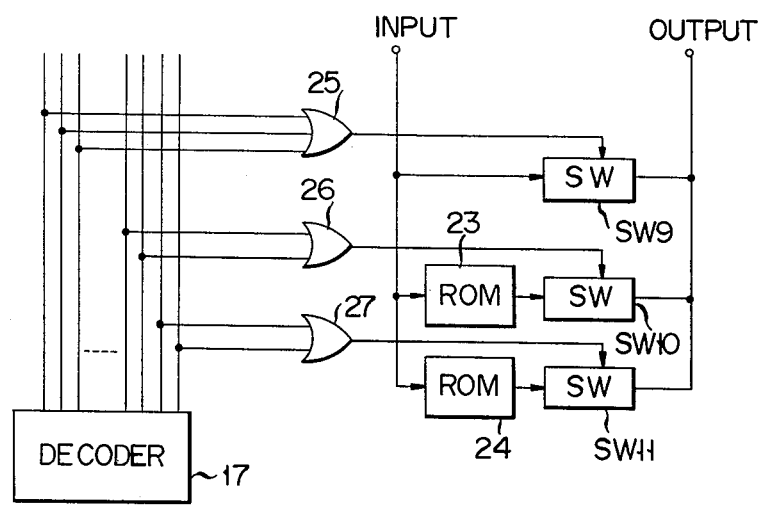
FIG. 6 is a circuit diagram of a modification of the variable attenuator used in the telephone exchanges shown in FIGS. 1 and 5.

Now referring to FIGS. 1 to 4, a telephone exchange according to this invention will be described. As illustrated in FIG. 1, two telephones T1 and T2 are coupled to a telephone exchange 10 through a central office 1, and two telephones T3 and T4 are coupled directly to the telephone exchange 10. The telephone exchange 10 is provided with interface circuits 11-1 to 11-4 which are coupled to the telephones T1 to T4, respectively. The term "interface circuit" is used here to mean both a central office trunk circuit and a line circuit. In the telephone exchange of FIG. 1, the interface circuits 11-1 and 11-2 are employed as central office trunk circuits, and the interface circuits 11-3 and 11-4 as line circuits. The interface circuits are of a known type which comprises, as shown in FIG. 2, a hybrid circuit 101 coupled to a telephone T, a transmission path constituted by a low-pass filter 102 and a PCM coder 103, and a reception path constituted by a PCM decoder 104 and a low-pass filter 105.

The transmission paths of the interface circuits 11-1, 11-2, 11-3, 11-4 are coupled to a variable attenuator 12 via switches SW1-1, SW1-2, SW1-3 and SW1-4, respectively. The reception paths of the interface circuits 11-1, 11-2, 11-3 and 11-4 are coupled to a variable attenuator 13 via switches SW2-1, SW2-2, SW2-3 and SW2-4, respectively. Between the variable attenuators 12 and 13 a known conference circuit/time slot shifter 14 is connected.

The telephone exchange 10 further includes a pulse generator 15, a 4-scale counter 16 and decoder 17. The counter 16 counts the output pulses of the pulse generator 15. The decoder 17 detects the count of the counter 16 and produces an output pulse corresponding to the count of the counter 16. The output pulses of the decoder 17 are subsequently delivered from output terminals D1 to D4 of the decoder 17, thereby to assign a time slot to each interface circuit 11. The output terminals D1 to D4 of the decoder 17 are coupled to control terminals of the switches SW1-1, SW1-2, SW1-3 and SW1-4, respectively and also to control terminals of the switches SW2-1, SW2-2, SW2-3 and SW2-4, respectively. Two of the output terminals of the decoder 17, for example, the terminals D3 and D4 are coupled via an OR gate 18 to the variable attenuators 12 and 13.

The variable attenuators 12 and 13 are constructed as illustrated in FIG. 3. That is, each variable attenuator includes a read only memory (ROM) 111, a switch SW3, a switch SW4 and an inverter 112. The ROM 111 receives an address signal from any of the switches SW1 and generates a data signal for attenuating speech signals by, for instance, 3 dB. The switch SW3 is closed in response to a pulse from the decoder 17 thereby to deliver from its output terminal the data signal read out of the ROM 111. The switch SW4 is closed in response to a pulse from the decoder via the inverter 112 thereby to deliver from its output terminal the input signal of the variable attenuator.

Now with reference to signal waveforms shown in FIGS. 4A-4E there will be described how the telephone exchange 10 realizes a telephone conference among four persons at the telephones T1, T2, T3 and T4. Here it is assumed that the telephones T1 and T2 are external ones, and the telephones T3 and T4 are extension telephones and that the transmission loss between the external telephone T1, T2 and the telephone exchange 10 is 3 dB, though no transmission loss occurs between the extension telephones T3, T4 and the telephone exchange 10. Thus, if the attenuation factors of the variable attenuators 12 and 13 are 0 dB, the speech path between the telephones T1 and T2 has a transmission loss of 6 dB, the speech path between the telephones T3 and T4 a transmission loss of 0 dB, and the speech path between the telephone T1 or T2 and the telephone T3 or T4 a transmission loss of 3 dB. To make the speech signal in any speech path have the same level, the variable attenuators 12 and 13 should be so controlled as to give all the speech paths connecting any telephones the same transmission loss of, for example, 6 dB.

The pulses from the output terminals D1 to D4 of the decoder 17 have such waveforms as illustrated in FIGS. 4A, 4B, 4C and 4D, respectively. In response to these pulses the switches SW2-1, SW2-2, SW2-3 and SW2-4 are closed. The variable attenuators 12 and 13 function as a 3 dB-attenuator while the pulses from the output terminals D3 and D4 last. In other words, they act as a 3 dB-attenuator in response to such pulses as shown in FIG. 4E. All the other times, they work as speech paths having no transmission loss.

When the switches SW1-1 and SW2-1, for example, are closed upon receipt of a pulse from the output terminal D1 of the decoder 17, all the other switches are open. In this condition, a speech signal from the telephone T1 is attenuated by 3 dB through the transmission line and then stored into a first memory (not shown) of the conference circuit/time slot shifter 14, without being attenuated by the variable attenuator 12. Similarly, when the switch SW1-2 is closed upon receipt of a pulse from the output terminal D2 of the decoder 17, a speech signal from the telephone T2 is attenuated by 3 dB through the transmission line and then stored into the first memory, without being attenuated by the variable attenuator 12. When the switch SW1-3 or SW1-4 is closed upon receipt of a pulse from the output terminal D3 or D4, respectively, a speech signal from the telephone T3 or T4 is attenuated by 3 dB by the variable attenuator 12 and then stored into the first memory.

The conference circuit/time slot shifter 14 carries out an arithmetic operation on the speech signals from the telepones T1 to T4, which all have been attenuated by 3dB and written into the first memory as described above. The result of the operation is stored into a second memory (not shown) of the conference circuit/time slot shifter 14. A data containing the speech signals from the telephones T2 to T4 is read out from the second memory when the switch SW2-1 is closed. The data is supplied to the interface circuit 11-1 without being attenuated by the variable attenuator 13 and is then transferred to the telephone T1 with an attenuation of 3 dB through the transmission line. The speech signals supplied from the telephones T2 to T4 to the telephone T1 have therefore been attenuated by 6 dB. Similarly, data containing the speech signals from the telephones T1, T3 and T4 is read from the second memory when the switch SW2-2 is closed. This data is supplied to the interface circuit 11-2 without being attenuated by the variable attenuator 13 and then transferred to the telephone T2 after being attenuated by 3 dB through the transmission line. The speech signals supplied from the telephones T1, T3 and T4 to the telephone T2 have therefore been attenuated by 6 dB. Further, when the switch SW2-3 or SW2-4 is closed, data containing the speech signals from the telephones T1, T2 and T4 or T3 are read out from the second memory of the conference circuit/time slot shifter 14. The data is attenuated by 3 dB by the variable attenuator 13 and then transferred to the telephone T3 or T4 via the interface circuit 11-3 or 11-4. Also in this case, the speech signals supplied to the telephone T3 or T4 from the other telephones have been attenuated by 6 dB. Thus, all the speech signals transferred through the paths established among the telephones T1 to T4 are attenuated by 6 dB. The speech signals transferred among these telephones therefore have similar levels, and a telephone conference can be effected under a favorable condition.

To make a telephone conversation between two telephones, for example, the telephones T1 and T3, the conference circuit/time slot shifter 14 functions as a time slot shifter. That is, its first memory stores speech signals from one telephone and then transfers the same to the second memory. In this case no arithmetic operation is carried out on the speech signals stored in the first memory. The speech signals are therefore supplied from one telephone to the other with a predetermined delay time.

FIG. 5 shows another embodiment of this invention. In FIG. 5, the same reference numerals are used to denote substantially the same parts as in FIG. 1.

In the embodiment of FIG. 5, switches SW1-1 to SW1-4 are coupled to one end of a variable attenuator 12 via a switch SW5. The other end of the variable attenuator 12 is coupled to switches SW2-1 to SW2-4 via a switch SW6 and to one end of a conference circuit/time slot shifter 14 via a switch SW7. The other end of the conference circuit/time slot shifter 14 is coupled to one end of the variable attenuator 12. There is provided a pulse generator 15, the output pulse of which is supplied to a counter 16 via a frequency divider 19 and also to a flip-flop 20. The counter 16 is coupled to a decoder 17, which, like the decoder 17 of the embodiment shown in FIG. 1, delivers output pules one after another from output terminals D1 to D4, thereby controlling the switches SW1-1 to SW1-4 and switches SW2-1 to SW2-4. The output of the flip-flop 20 is inverted twice every time the counter counts one pulse from frequency divider 19. The output terminals of the flip-flop 20 is coupled to control terminals of the switches SW5 and SW7 and to control terminals of the switches SW6 and SW8 via inverters 21 and 22, respectively.

When the flip-flop 20 generates, for instance, a high level signal, the switches SW5 and SW7 are closed. As the switches SW1-1 to SW1-4 are closed under this condition one after another upon receipt of pulses from the decoder 17, speech signals from telephones T1 to T4 are stored into a first memory (not shown) of the conference circuit/time slot shifter 14 through the variable attenuator 12. When the output of the flip-flop 20 is inverted by a pulse from the pulse generator 15, the flip-flop 20 generates a low level signal. Then the switches SW5 and SW7 are opened, and the switches SW6 and SW8 are closed. Once the switches SW6 and SW8 have been closed, the conference circuit/time slot shifter 14 starts carrying out an arithmetic operation on the data stored in the first memory and containing the speech signals from the telephone T1 to T4. The result of the arithmetic operation is then written into a second memory (not shown). Every time the counter counts one pulse from the frequency divider 19, the decoder 17 subsequently delivers output signals from its output terminals D1 to D4, thus closing the switch SW1-1 and SW2-1, switches SW1-2 and SW2-2, switches SW1-3 and SW2-3 and switches SW1-4 and SW2-4 in this order. As the switch SW2-1 is closed, data including the speech signals from the telephones T2, T3 and T4 is supplied from the second memory of the conference circuit/time slot shifter 14 to the telephone T1 via the switch SW8, variable attenuator 12, switch SW6, switch SW2-1 and an interface circuit 11-1. Similarly as the switches SW2-2, SW2-3 and SW2-4 are closed one after another, data including the speech signals from the telephones T1, T3, and T4, data including the speech signals from the telephones T1, T2 and T4 and data including the speech signals from the telephones T1, T2 and T3 are supplied from the second memory of the conference circuit/time slot shifter 14 to the telephones T2, T3 and T4, respectively via the switch SW8, variable attenuator 12, switch SW6, and respectively via the switches SW2-2, SW2-3 and SW2-4 and the interface circuits 11-2, 11-3 and 11-4. In this way, each telephone receives data representing the speech signals from the other telephones from the second memory of the conference circuit/time slot shifter 14.

The embodiment shown in FIG. 5 is further provided with an OR gate 18 which connects one or more proper output terminals of the decoder 17 to a control terminal of the variable attenuator 12. It is therefore possible to attenuate all the speech signals transferred in the speech paths established among the telephones T1 to T4, eventually to the same degree.

Thus far two embodiments of this invention have been described. The invention, however, is not limited to these embodiments. Instead of the variable attenuator 12 shown in FIG. 3, use may be made of a variable attenuator of such a construction as illustrated in FIG. 6. This variable attenuator is constituted by a switch SW9 connected between input and output terminals, two ROMs 23 and 24 each having an address input terminal coupled to the input terminal, a switch SW10 coupled between the output terminal and the readout terminal of the ROM 23, and a switch SW11 coupled between the output terminal and the readout terminal of the ROM 24. The switches SW9, SW10 and SW11 are controlled by OR gates 25, 26 and 27, respectively, which are selectively coupled to the output terminals of the decoder 17. With such construction, the variable attenuator can attenuate an input signal to a predetermined degree at a selected time.

Further, in the embodiments of FIGS. 1 and 5 the attenuation factor of the variable attenuator 12 is controlled by timing pulses from the output terminals D3 and D4 of the decoder 17. Instead, the attenuation factor may be controlled by timing pulses from the other output terminals of the decoder 17.

Moreover, the embodiments of FIGS. 1 and 5 use two external telephones T1 and T2 and two extension telephones T3 and T4. More or less telephones may of course be used, merely by changing the number of interface circuits 11, the modulo of the counter 19 and the number of output terminals of the decoder 17.

What we claim is:

1. A telephone exchange comprising a plurality of interface circuits each having a transmission path and a reception path; first switching means with one end coupled to the transmission paths of the interface circuits; second switching means coupled to the reception paths of the interface circuits; first and second variable attenuating means coupled at one end to the first and second switching means, respectively; a conference circuit coupled between the other ends of the first and second variable attenuating means; and control means coupled to the first and second switching means and to the first and second variable attenuating means for supplying timing signals to the first and second switching means and thus controlling the same in time-sharing fashion, thereby establishing speech paths among the interface circuits in time-sharing fashion and for supplying control signals synchronous with said timing signals to the first and second variable attenuating means and thus controlling the same in time-sharing fashion, thereby attenuating speech signals being transferred through the speech paths according to the controlled attenuation factors of the first and second variable attenuating means.

2. A telephone exchange according to claim 1, wherein said first and second switching means are each constituted by a first group of switches and a second group of switches, said control means has a plurality of output terminals coupled to the switches of both groups for subsequently supplying output signals to the switches, thereby coupling the transmission paths of said interface circuits to the first variable attenuating means in time-sharing fashion and coupling the reception paths of said interface circuits to the second variable attenuating means in time-sharing fashion, at least one of said output terminals being connected to both first and second variable attenuating means to control the attenuation factors of said first and second variable attenuating means.

3. A telephone exchange according to claim 2, wherein at least one of said interface circuits is an extension circuit, and the output terminal of said control means which is coupled to the extension circuit is coupled to said first and second variable attenuating means to control the attenuation factors of said first and second variable attenuating means.

4. A telephone exchange according to claim 1, 2 or 3, wherein said first and second variable attenuating means each have at least one read only memory for receiving an address signal from said first switching means and for generating a data signal for attenuating speech signals, a first switch coupled in series with the read only memory and a second switch coupled in parallel to the read only memory and the first switch, said first switch and said second switch being closed at differing times whereby said first switch upon being closed allows the contents of said read only memory to pass therethrough and said second switch upon being closed allows said address signal to pass therethrough.

5. A telephone exchange comprising a plurality of interface circuits each having a transmission path and a reception path; first switching means with one end coupled to the transmission paths of the interface circuits; second switching means coupled to the reception paths of the interface circuits; variable attenuating means; a conference circuit; third switching means for coupling one end of the variable attenuating means alternatively to the other end of the first switching means and one end of the conference circuit; fourth switching means for coupling the other end of the variable attenuating means alternatively to the other end of the second switching means and the other end of the conference circuit; and control means coupled to the first to fourth switching means and the variale attenuating means for supplying timing signals to the first to fourth switching means and thus controlling the same in time-sharing fashion, thereby coupling the transmission paths of the interface circuits to the conference circuit via the variable attenuating means in time-sharing fashion during a first operation cycle and coupling the reception paths of the interface circuits to the conference circuit via the variable attenuating means in time-sharing fashion during a second operation cycle and for selectively supplying a control signal synchronous with said timing signals to the variable attenuating means, thereby controlling the attenuation factor of the variable attenuating means.

* * * * *